United States Patent
Mao

(10) Patent No.: US 10,010,952 B2
(45) Date of Patent: Jul. 3, 2018

(54) CUTTING INSERT, CUTTING TOOL, AND METHOD OF MANUFACTURING MACHINED PRODUCT

(71) Applicant: KYOCERA Corporation, Kyoto-shi, Kyoto (JP)

(72) Inventor: Shohei Mao, Yasu (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/511,808

(22) PCT Filed: Sep. 26, 2015

(86) PCT No.: PCT/JP2015/077221
§ 371 (c)(1),
(2) Date: Mar. 16, 2017

(87) PCT Pub. No.: WO2016/047795
PCT Pub. Date: Mar. 31, 2016

(65) Prior Publication Data
US 2017/0291231 A1    Oct. 12, 2017

(30) Foreign Application Priority Data

Sep. 26, 2014    (JP) .................. 2014-196026

(51) Int. Cl.
*B23C 5/00* (2006.01)
*B23C 5/20* (2006.01)
*B23C 5/10* (2006.01)

(52) U.S. Cl.
CPC .............. *B23C 5/207* (2013.01); *B23C 5/109* (2013.01); *B23C 2200/125* (2013.01); *B23C 2200/246* (2013.01)

(58) Field of Classification Search
CPC ....... B23C 5/207; B23C 5/109; B23C 5/2221; B23C 2200/0411; B23C 2200/0416;
(Continued)

(56) References Cited

U.S. PATENT DOCUMENTS 4,140,431 A    2/1979 Friedline et al.
8,834,075 B2   9/2014 Choi et al.
(Continued)

FOREIGN PATENT DOCUMENTS

JP    2010-523352 A    7/2010
JP    2011-522712 A    8/2011
(Continued)

*Primary Examiner* — Will Fridie, Jr.
(74) *Attorney, Agent, or Firm* — Volpe and Koenig, P.C.

(57) ABSTRACT

A cutting insert of an embodiment includes an upper surface including a first upper cutting edge and a second upper cutting edge, a lower surface including a first lower cutting edge and a second lower cutting edge, and a side surface. The side surface includes a first surface extending from the second upper cutting edge, a second surface extending from the first lower cutting edge, a third surface extending from the first upper cutting edge, and a fourth surface extending from the second lower cutting edge. The first surface and the fourth surface are parallel to a central axis. The second surface is inclined so as to depart from the central axis as going from the lower surface toward the upper surface. The third surface is inclined so as to depart from the central axis as going from the upper surface toward the lower surface.

8 Claims, 15 Drawing Sheets

(58) Field of Classification Search
CPC ...... B23C 2200/0494; B23C 2200/205; B23C 2200/12; B23C 2200/125; B23C 2200/126; B23C 2210/08
See application file for complete search history.

(56) References Cited

U.S. PATENT DOCUMENTS

| | | | | |
|---|---|---|---|---|
| 9,039,335 B2* | 5/2015 | Hedberg | ................ | B23C 5/207 407/113 |
| 9,770,767 B2* | 9/2017 | Shibata | .................... | B23C 5/06 |
| 9,855,613 B2* | 1/2018 | Kumoi | .................... | B23C 5/02 |
| 2010/0080662 A1* | 4/2010 | Satran | ................... | B23C 5/2213 407/40 |
| 2010/0111619 A1 | 5/2010 | Ballas et al. | | |
| 2012/0009029 A1* | 1/2012 | Saji | ...................... | B23C 5/109 407/67 |
| 2014/0212228 A1* | 7/2014 | Horiike | ................... | B23C 5/109 407/42 |
| 2014/0298967 A1* | 10/2014 | Ishi | ....................... | B23C 5/109 83/13 |
| 2017/0197259 A1* | 7/2017 | Kumoi | ................... | B23C 5/207 |

FOREIGN PATENT DOCUMENTS

| | | |
|---|---|---|
| JP | 2013-535351 A | 9/2013 |
| WO | 2008/120186 A1 | 10/2008 |
| WO | 2008/120188 A1 | 10/2008 |
| WO | 2012/021414 A1 | 2/2012 |

* cited by examiner

CUTTING INSERT, CUTTING TOOL, AND METHOD OF MANUFACTURING MACHINED PRODUCT

TECHNICAL FIELD

The present embodiment relates to a cutting insert, a cutting tool, and a method of manufacturing a machined product.

BACKGROUND ART

As a cutting insert (hereinafter also referred to simply as "insert") for use in a cutting process of workpieces, such as metals, a cutting insert described in Japanese Unexamined Patent Publication No. 2010-523352 (Patent Document 1) is known. The insert described in Patent Document 1 includes a major flank surface extending from a major cutting edge close to an upper surface toward a minor cutting edge close to a lower surface, and a minor flank surface extending from the minor cutting edge close to the upper surface toward the major cutting edge close to the lower surface. The major flank surface is inclined so as to depart from a central axis of a through hole as going from the upper surface toward the lower surface. The minor flank surface is inclined so as to approach the central axis of the through hole as going from the upper surface toward the lower surface. The insert described in Patent Document 1 is configured to be attached to a tool body (holder) by a bolt (screw) to be inserted into the through hole. On this occasion, the two major flank surfaces on a side surface come into contact with the tool body.

When a cutting process is carried out using the insert described in Patent Document 1, a force is applied to the major cutting edge and the minor cutting edge used for cutting in a direction from the upper surface toward the lower surface. Therefore, as a reaction against the force, a force is apt to be applied to the two major flank surfaces being in contact with the tool body in the direction from the lower surface toward the upper surface.

Here, the major flank surface is inclined so as to depart from the central axis of the through hole as going from the upper surface toward the lower surface, thus making it easier for the insert to slide toward a workpiece. This makes it easier for the insert to slide laterally with respect to the through hole configured to accept insertion of the bolt. Accordingly, the bolt can be subjected to a large lateral load, namely, a large shear stress. It can therefore be difficult to stably fix the insert to the holder.

The present embodiment has been accomplished in view of the above problem, and provides a cutting insert capable of being stably fixed to the holder.

SUMMARY OF THE INVENTION

A cutting insert according to an embodiment includes an upper surface including a plurality of side parts, a lower surface including a plurality of side parts, a side surface located between the upper surface and the lower surface, a plurality of upper cutting edges which are individually located along one of the side parts on the upper surface and individually include a first upper cutting edge and a second upper cutting edge, and a plurality of lower cutting edges which are individually located along one of the side parts on the lower surface and individually include a first lower cutting edge and a second lower cutting edge, and a through hole extending between the upper surface and the lower surface. The first lower cutting edge is located below the second upper cutting edge. The second lower cutting edge is located below the first upper cutting edge. The side surface includes a first surface extending downward from the second upper cutting edge, a second surface extending upward from the first lower cutting edge, a third surface extending downward from the first upper cutting edge, and a fourth surface extending upward from the second lower cutting edge. The first surface and the fourth surface are located along a central axis of the through hole. The second surface is inclined so as to further depart from the central axis than the first surface as going from the lower surface toward the upper surface. The third surface is inclined so as to further depart from the central axis than the fourth surface as going from the upper surface toward the lower surface.

EMBODIMENTS FOR CARRYING OUT THE INVENTION

\<Cutting Insert\>

Figure 1:
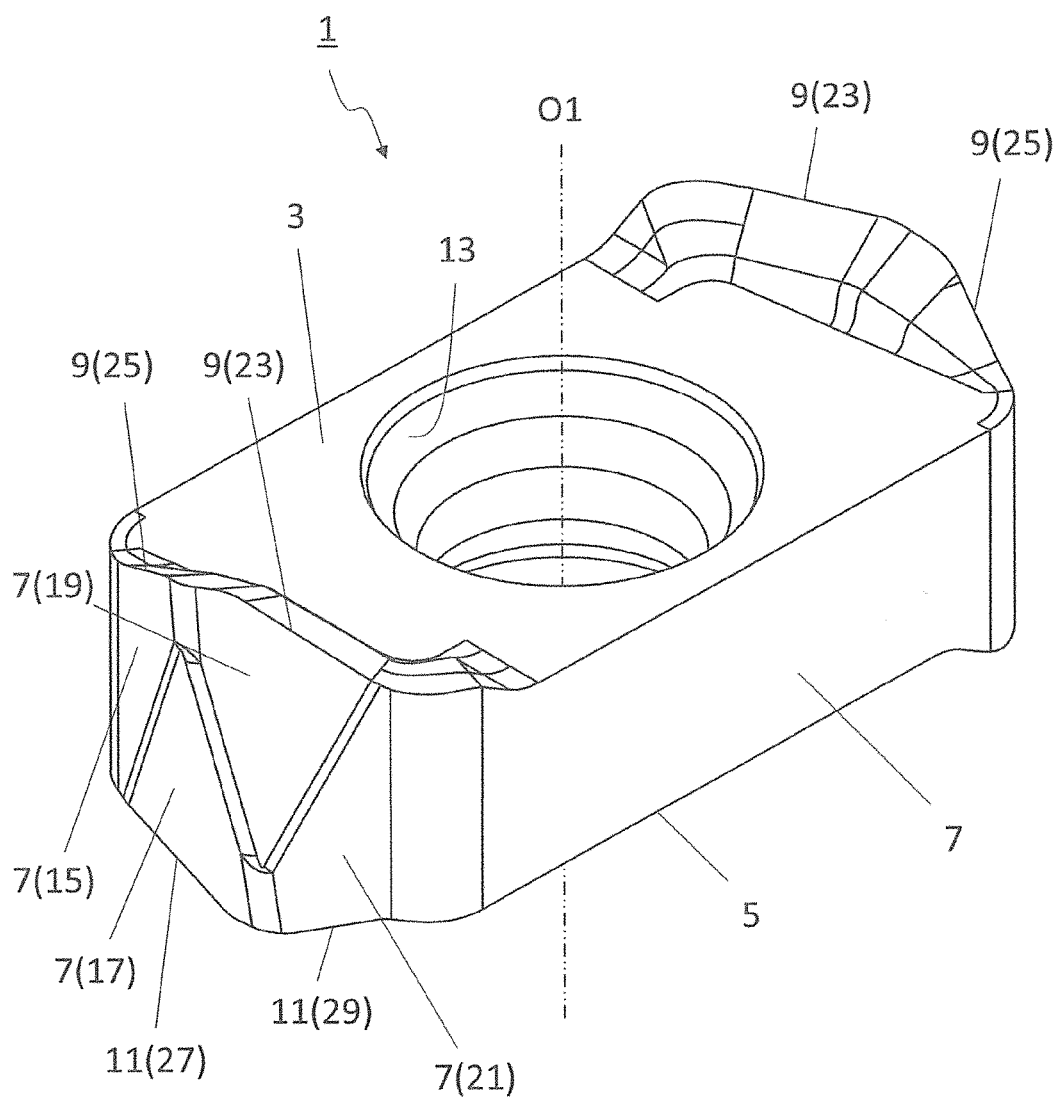
FIG. 1 is a perspective view that shows a cutting insert according to an embodiment of the present invention.

A cutting insert 1 of an embodiment is described in detail below with reference to the drawings. For the sake of convenience, the drawings referred to in the following show, in simplified form, only main components among components of the embodiment, which are necessary for describing the present invention. Therefore, the cutting insert of the present invention may include any optional component not shown in the drawings referred to in the present description. Sizes of the components in the drawings are not faithful to sizes of actual components and to size ratios of the actual components.

The cutting insert 1 (hereinafter also referred to simply as "insert 1") of the embodiment includes an upper surface 3, a lower surface 5, a side surface 7, an upper cutting edge 9, a lower cutting edge 11, and a through hole 13 as shown in FIGS. 1 to 9. As a material of the insert 1, for example, cemented carbide or cermet is usable.

As a composition of the cemented carbide, there are, for example, WC—Co, WC—TiC—Co, and WC—TiC—TaC—Co. The WC—Co is produced by adding cobalt (Co) powder to tungsten carbide (WC), followed by sintering. The WC—TiC—Co is produced by adding titanium carbide (TiC) to WC—Co. The WC—TiC—TaC—Co is produced by adding tantalum carbide (TaC) to WC—TiC—Co.

The cermet is a sintered composite material obtainable by compositing metal into a ceramic ingredient. A specific example of the cermet is one which is composed mainly of a titanium compound, such as titanium carbide (TiC) or titanium nitride (TiN).

A surface of each of the above members constituting the insert 1 may be coated with a coating film by using chemical vapor deposition (CVD) method or physical vapor deposition (PVD) method. As a composition of the coating film, there are, for example, titanium carbide (TiC), titanium nitride (TiN), titanium carbonitride (TiCN), and alumina ($Al_2O_3$).

Figure 2:
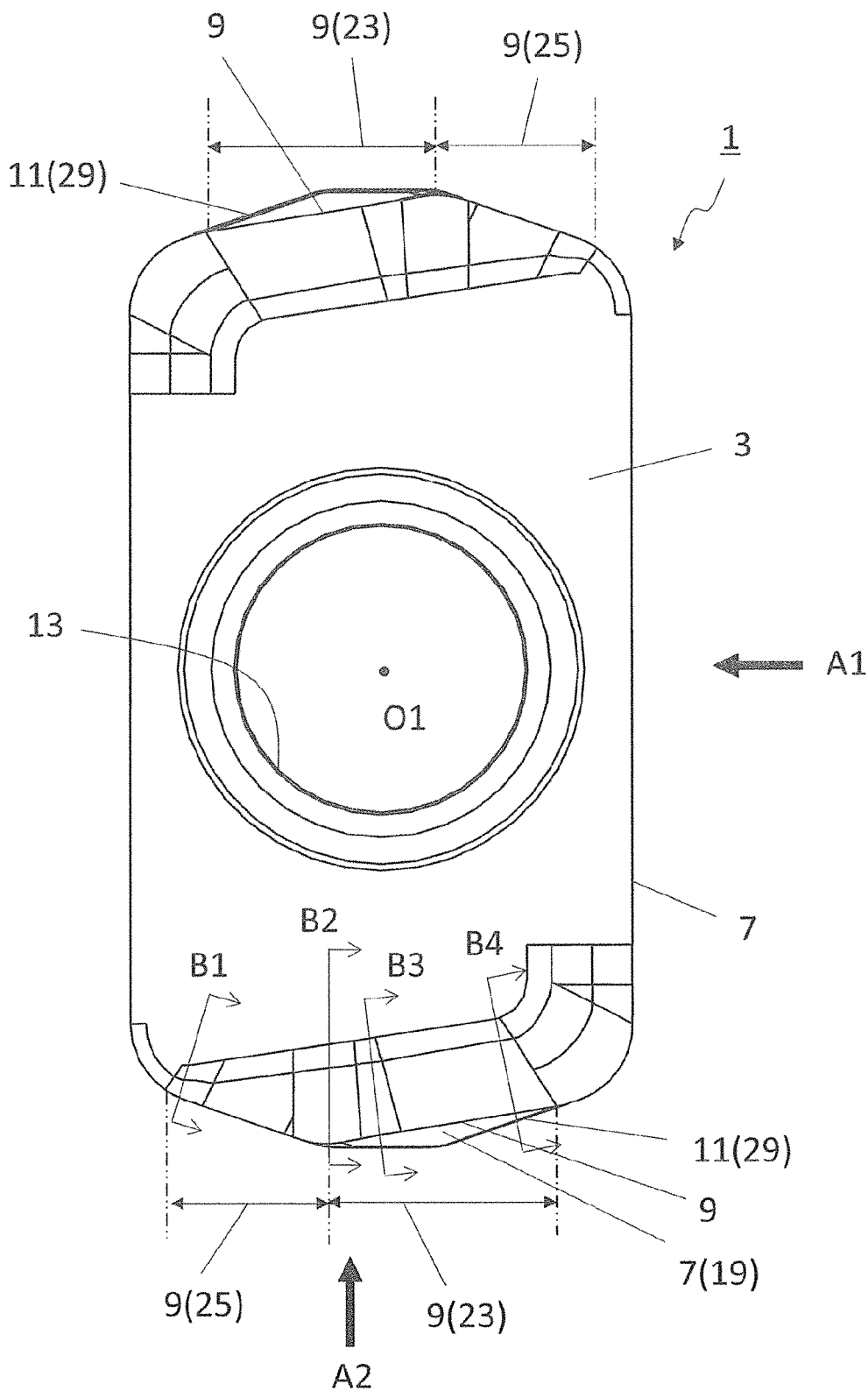
FIG. 2 is a top view of the cutting insert shown in FIG. 1.
Figure 3:
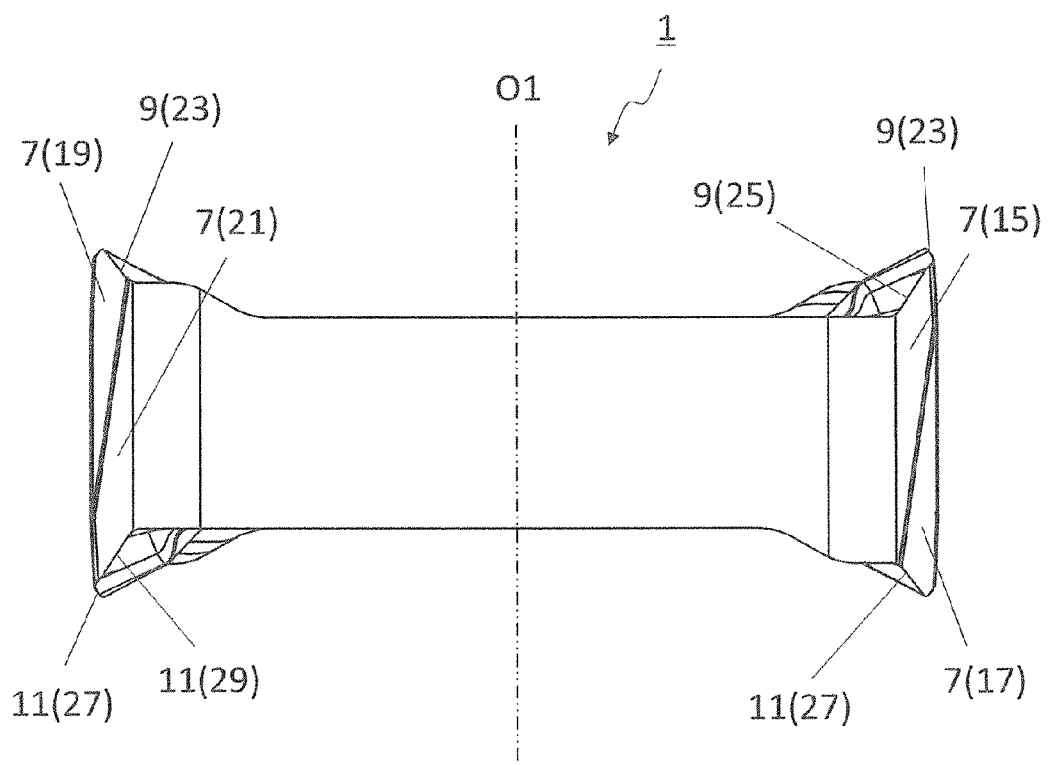
FIG. 3 is a side view of the cutting insert shown in FIG. 2, taken along A1 direction.

The upper surface 3 has a polygonal shape having rotational symmetry, and is formed into an approximately rectangular shape having rotational symmetry of 180° in the present embodiment as shown in FIG. 2. The rectangular-shaped upper surface 3 includes a plurality of upper corner parts and a plurality of upper side parts located between the upper corner parts adjacent to each other. Specifically, the upper surface 3 includes four upper corner parts and two upper side parts corresponding to short sides of the rectangular shape in the present embodiment.

Figure 5:
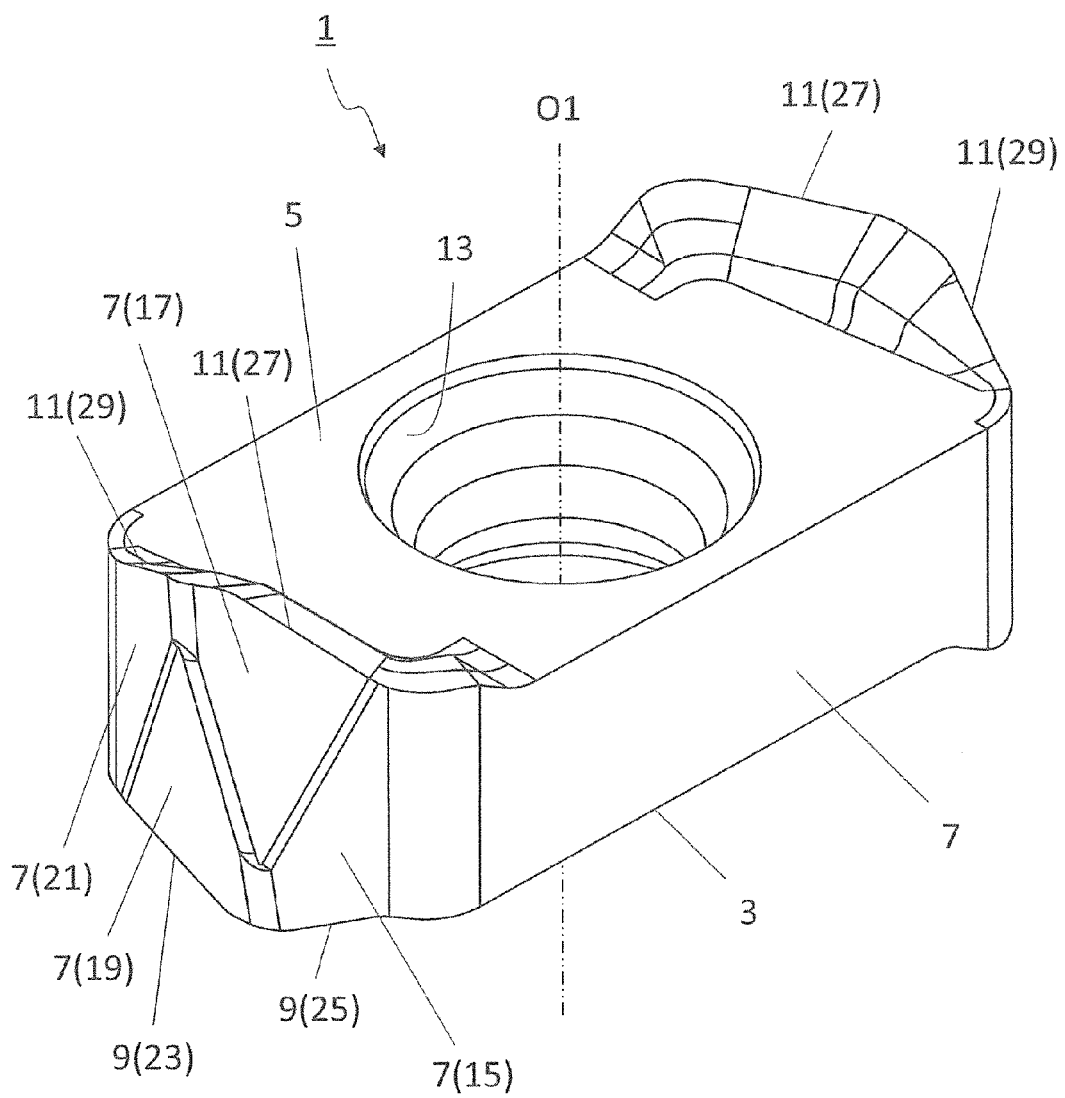
FIG. 5 is a perspective view of the cutting insert shown in FIG. 1, taken from a lower surface side thereof.
Figure 6:
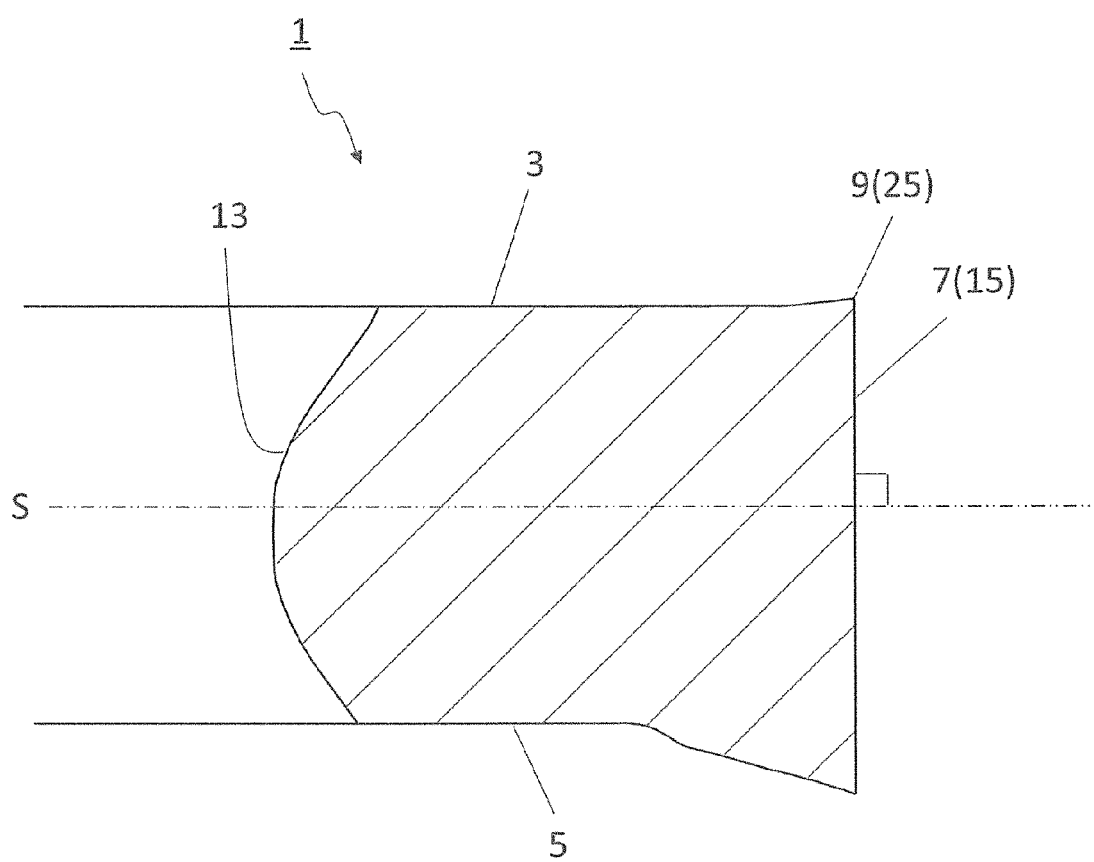
FIG. 6 is a sectional view of section plane B1 of the cutting insert shown in FIG. 2.

The lower surface 5 has a polygonal shape having rotational symmetry corresponding to the upper surface 3. Similarly to the upper surface 3, the lower surface 5 is formed into an approximately rectangular shape having rotational symmetry of 180° in the present embodiment as shown in FIG. 5. The rectangular-shaped lower surface 5 includes a plurality of lower corner parts and a plurality of lower side parts located between the lower corner parts adjacent to each other. Specifically, the lower surface 5 includes four lower corner parts and two lower side parts corresponding to short sides of the rectangular shape in the present embodiment.

The upper surface 3 and the lower surface 5 in the present embodiment have the shape with rotational symmetry. In the case of having the shape with rotational symmetry, the center of the rotational symmetry corresponds to the center of the upper surface 3 or the center of the lower surface 5.

Although the lower surface 5 has the polygonal shape corresponding to the upper surface 3 and has the same size, an entire outer edge of the upper surface 3 and an entire outer edge of the lower surface 5 are not located in an overlapped manner when seen through from above. The center of the upper surface 3 and the center of the lower surface 5 are located in an overlapping manner, and the upper corner parts and the lower corner parts are located in an overlapping manner, whereas the upper side parts and the lower side parts are not located in a completely overlapping manner when seen through from above.

Here, the polygonal shape does not denote a strict polygonal shape. For example, each of the upper corner parts on the upper surface 3 in the present embodiment is not made into a strict corner, but has a rounded shape in a top view. Each of the upper side parts on the upper surface 3 in the present embodiment is not made into a strict straight line, but is made into a shape that protrudes outward in a top view.

The shapes of the upper surface 3 and the lower surface 5 are not limited to the above embodiment. In the insert 1 of the present embodiment, the upper surface 3 and the lower surface 5 have an approximately square shape. Alternatively, the upper surface 3 and the lower surface 5 may have a polygonal shape, such as a triangular or hexagonal shape having rotational symmetry.

The insert 1 of the present embodiment includes the through hole 13 extending between the upper surface 3 and the lower surface 5. The through hole 13 is disposed for inserting a screw therethrough when screwing the insert 1 into the holder of a cutting tool.

In the insert 1 of the present embodiment, the through hole 13 is located between the center of the upper surface 3 and the center of the lower surface 5. Therefore, a central axis O1 of the through hole 13 extends vertically. In order to evaluate a position of each of the components in the vertical direction in the insert 1 of the present embodiment, a reference plane S that is orthogonal to the central axis O1 and located between the upper surface 3 and the lower surface 5 is set in the following.

The side surface 7 is located between the upper surface 3 and the lower surface 5, and is connected to the upper surface 3 and the lower surface 5. The side surface 7 includes a plurality of first surfaces 15, a plurality of second surfaces 17, a plurality of third surfaces 19 and a plurality of fourth surfaces 21.

The upper cutting edges 9 are respectively located along the upper side parts on the upper surface 3. Each of the upper cutting edges 9 includes a first upper cutting edge 23 and a second upper cutting edge 25. In other words, the insert 1 of the present embodiment includes two first upper cutting edges 23 and two second upper cutting edges 25.

The first upper cutting edge 23 and the second upper cutting edge 25 are in the shape of a straight line, but are not located on a straight line in a top view. When the first upper cutting edge 23 and the second upper cutting edge 25 are in the shape of the straight line in the top view, it is avoidable that a cutting load is concentrated locally at the first upper cutting edge 23 and the second upper cutting edge 25. It is therefore possible to enhance durability of the first upper cutting edge 23 and the second upper cutting edge 25.

The first upper cutting edge 23 and the second upper cutting edge 25 are located so as to form an obtuse angle in a top view. Therefore, each of the upper side parts is in the shape that protrudes outward in the top view as described above. When the first upper cutting edge 23 and the second upper cutting edge 25 are so located, it is avoidable that a cutting load is excessively concentrated at a boundary part between the first upper cutting edge 23 and the second upper cutting edge 25. It is therefore possible to suitably use the second upper cutting edge 25 during a helical process or lapping process, while using the first upper cutting edge 23 as a major cutting edge, as described later.

The first upper cutting edge 23 is a segment used as the major cutting edge during a cutting process of a workpiece. Upon attachment to the holder, the first upper cutting edge 23 is attached so as to depart from the workpiece as departing from the second upper cutting edge 25 adjacent to the first upper cutting edge 23. The second upper cutting edge 25 is a segment auxiliary used during the cutting process of the workpiece, and is used during the helical process or lapping process. Upon attachment to the holder, the second upper cutting edge 25 is attached so as to depart from the workpiece as departing from the first upper cutting edge 23 adjacent to the second upper cutting edge 25. In other words, when the insert 1 is being attached to the holder, the boundary part between the first upper cutting edge 23 and the second upper cutting edge 25 is located closest to the front end side of the holder.

When the upper cutting edge 9 being used is deteriorated due to the cutting process over a long period of time in the cutting tool using the insert 1 of the present embodiment, the insert 1 needs to be temporarily removed from the holder and then reattached to the holder by turning the insert 1 180° around the central axis O1. This makes it possible to use an unused other upper cutting edge 9 in the cutting process of the workpiece.

Lower cutting edges 11 are respectively located on the lower side parts on the lower surface 5. Each of the lower cutting edges 11 includes a first lower cutting edge 27 and a second lower cutting edge 29. That is, the insert 1 of the present embodiment includes two first lower cutting edges 27 and two second lower cutting edges 29.

The first lower cutting edge 27 and the second lower cutting edge 29 are in the shape of a straight line, but are not located on a straight line in a bottom view. When the first lower cutting edge 27 and the second lower cutting edge 29 are in the shape of the straight line in the bottom view, it is avoidable that a cutting load is concentrated locally at the first lower cutting edge 27 and the second lower cutting edge 29. It is therefore possible to enhance durability of the first lower cutting edge 27 and the second lower cutting edge 29.

The first lower cutting edge 27 and the second lower cutting edge 29 are located so as to form an obtuse angle in a bottom view. Therefore, each of the lower side parts is in a shape that protrudes outward in the bottom view. When the first lower cutting edge 27 and the second lower cutting edge 29 are so located, it is avoidable that a cutting load is excessively concentrated at a boundary part between the first lower cutting edge 27 and the second lower cutting edge 29. It is therefore possible to suitably use the second lower cutting edge 29 during the helical process or lapping process, while using the first lower cutting edge 27 as the major cutting edge, as described later.

Similarly to the first upper cutting edge 23, the first lower cutting edge 27 is a segment used as the major cutting edge during the cutting process of the workpiece. Similarly to the second upper cutting edge 25, the second lower cutting edge 29 is a segment auxiliary used during the cutting process of the workpiece, and is used during the helical process or lapping process. When the lower cutting edge 11 being used is deteriorated due to the cutting process over a long period of time in the cutting tool using the insert 1 of the present embodiment, the insert 1 needs to be temporarily removed from the holder and then reattached to the holder by turning the insert 1 180° around the central axis O1.

The first lower cutting edge 27 is located below the second upper cutting edge 25 and the second lower cutting edge 29 is located below the first upper cutting edge 23 in a side view of the insert 1. Specifically, the segments of the cutting edges are located so as to ensure overlapping between the first upper cutting edge 23 and the first lower cutting edge 27 and overlapping between the second upper cutting edge 25 and the second lower cutting edge 29 when the insert 1 is turned upside down by reversing the central axis O1. Hence, the lower cutting edge 11 is usable in the same manner as the upper cutting edge 9 by turning the insert 1 upside down.

A so-called honing process may be applied to a region in which the upper cutting edge 9 and the lower cutting edge 11 are located. That is, neither a ridge line along which the upper surface 3 and the side surface 7 intersect each other, nor a ridge line along which the lower surface 5 and the side surface 7 intersect each other needs to be a strict line form formed by the intersection of the two surfaces. The line-shaped ridge lines cause strength deterioration of the upper cutting edge 9 and the lower cutting edge 11. Therefore, round honing is carried out to make the region into a curved surface shape.

A maximum width of the upper surface 3 in a top view of the insert 1 of the present embodiment is 6-25 mm. A height from the lower surface 5 to the upper surface 3 is 1-10 mm. Here, the height from the lower surface 5 to the upper surface 3 denotes a height in a direction parallel to the central axis O1 between an upper end of the upper surface 3 and a lower end of the lower surface 5.

The side surface 7 includes the first surfaces 15, the second surfaces 17, the third surfaces 19, and the fourth surfaces 21 as described above. The first surface 15 is a region of the side surface 7 which extends downward from the second upper cutting edge 25. The second surface 17 is a region of the side surface 7 which extends upward from the first lower cutting edge 27. The third surface 19 is a region of the side surface 7 which extends downward from the first upper cutting edge 23. The fourth surface 21 is a region of the side surface 7 which extends upward from the second lower cutting edge 29.

Figure 4:
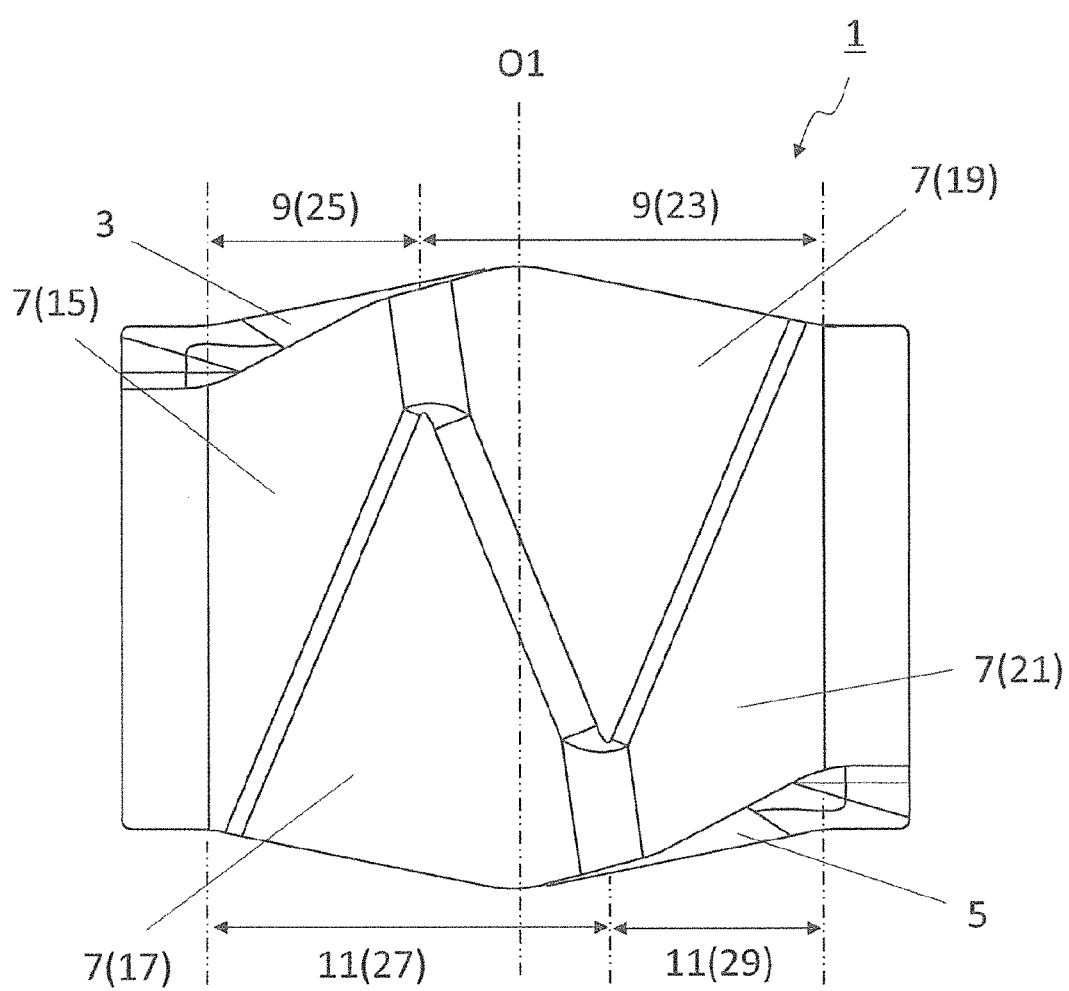
FIG. 4 is a side view of the cutting insert shown in FIG. 2, taken along A2 direction.

As shown in FIG. 4, the first surface 15, the second surface 17, the third surface 19 and the fourth surface 21 are sequentially located side by side in a side view. In FIG. 4, the first surface 15 is located leftmost, and the second surface 17 is located on the right side of the first surface 15. The third surface 19 is located on the right side of the second surface 17, and the fourth surface 21 is located on the right side of the third surface 19.

Each of the first surface 15, the second surface 17, the third surface 19 and the fourth surface 21 in the present embodiment is a flat surface. The first to fourth surfaces made up of the flat surfaces ensures a stable fixing of the insert 1 to the holder when attaching the insert 1 to the holder.

Thus in the present embodiment, the region of the side surface 7 located between the second upper cutting edge 25 and the first lower cutting edge 27 is made up of the first surface 15 and the second surface 17, instead of a single flat surface region. The region located between the second lower cutting edge 29 and the first upper cutting edge 23 is also made up of the third surface 19 and the fourth surface 21, instead of a single flat surface region.

The first surface 15 is located along the central axis O1 of the through hole 13, and is parallel to the central axis O1 of the through hole 13 in the present embodiment. The fourth surface 21 is located along the central axis O1 of the through hole 13, and is parallel to the central axis O1 of the through hole 13 in the present embodiment.

Figure 7:
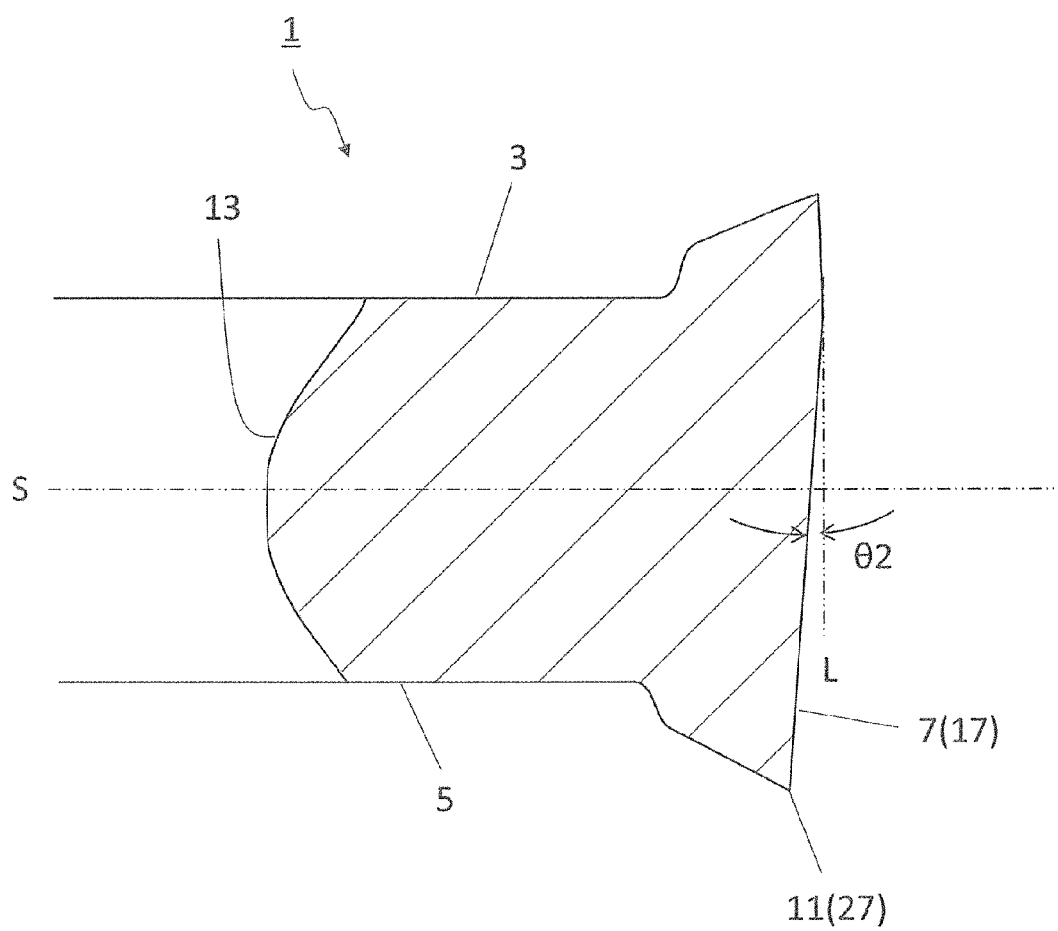
FIG. 7 is a sectional view of section plane B2 of the cutting insert shown in FIG. 2.
Figure 8:
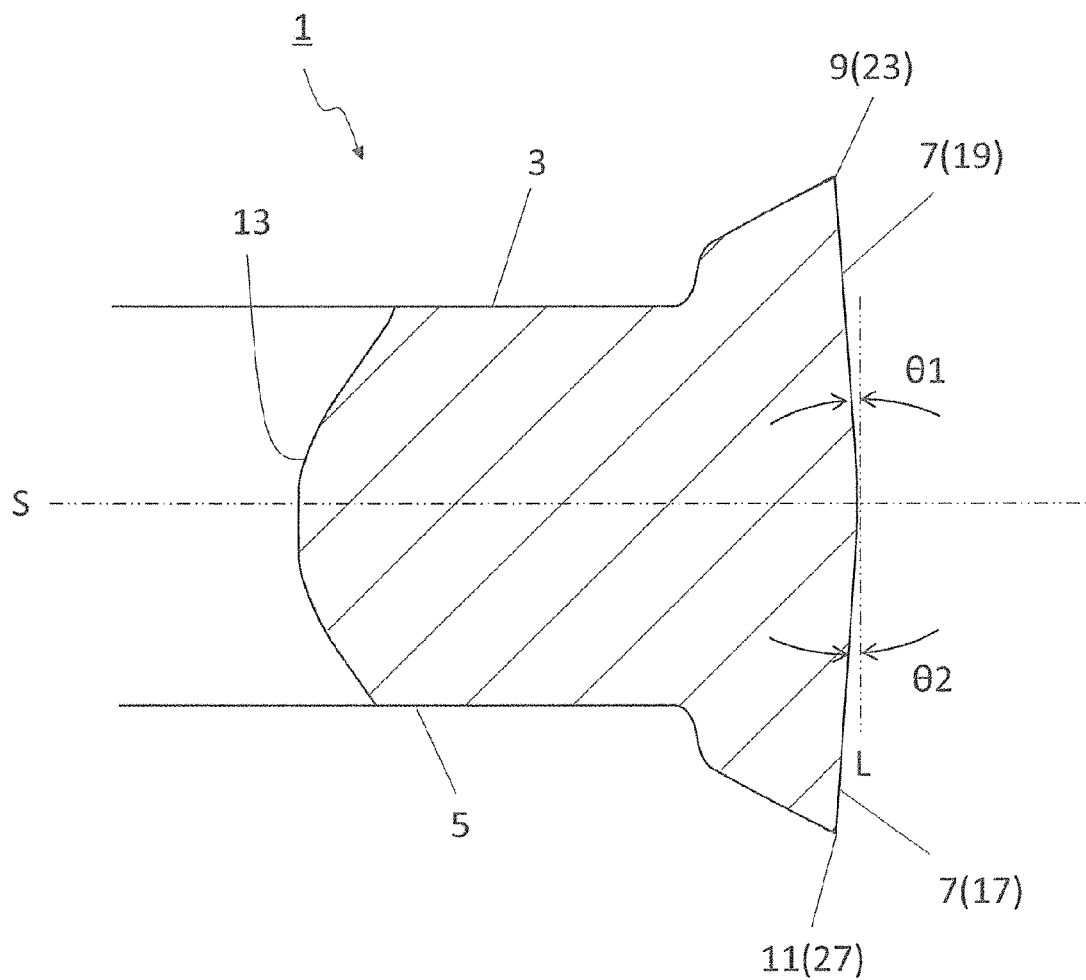
FIG. 8 is a sectional view of section plane B3 of the cutting insert shown in FIG. 2.

The second surface 17 is inclined so as to further depart from the central axis O1 than the first surface 15 as going from the lower surface 5 toward the upper surface 3. Specifically, the second surface 17 is inclined at an angle θ2 with respect to the central axis O1 in a sectional view. A ridge line is formed between the first surface 15 and the second surface 17 because the first surface 15 and the second surface 17 are located as described above. In FIGS. 7 and 8, a straight line L orthogonal to the reference plane S and parallel to the central axis O1 is indicated, the central axis O1 is replaced with the straight line L, and the angle θ2 is indicated by an inclination angle with respect to the straight line L. The angle θ2 is settable to, for example, approximately 1-10°.

Figure 9:
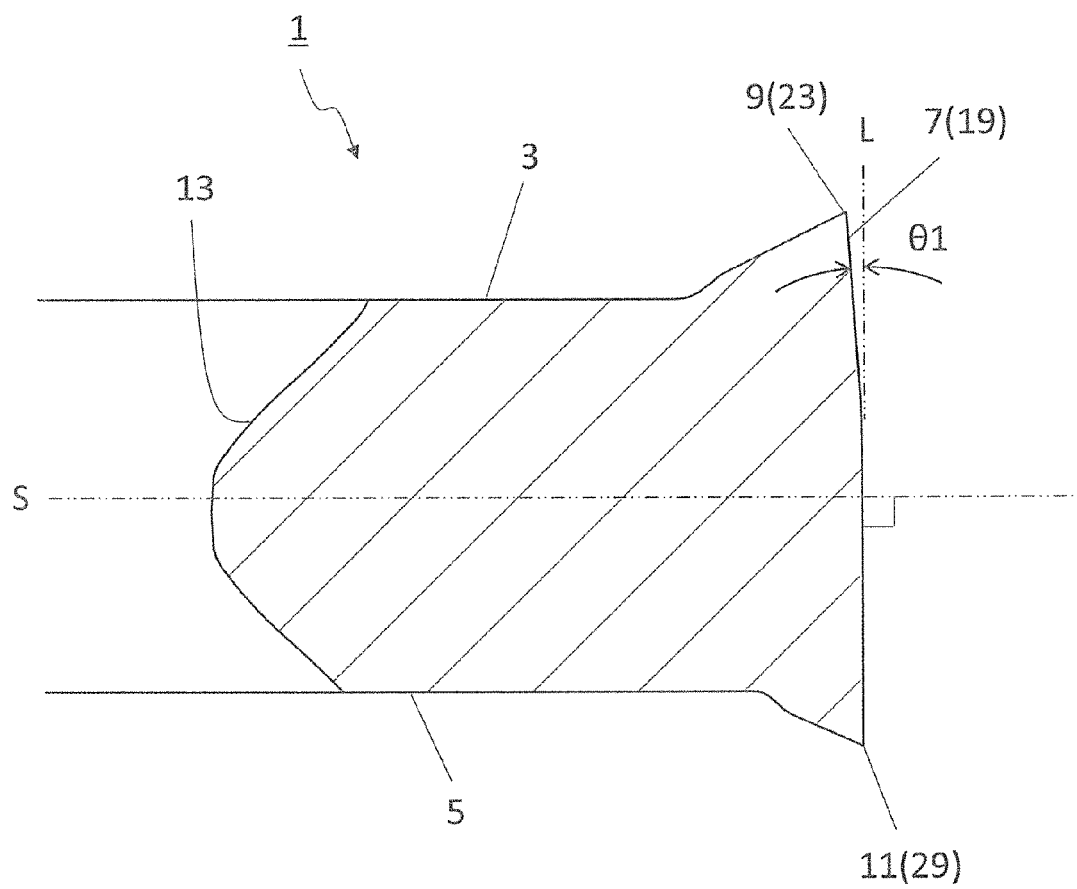
FIG. 9 is a sectional view of section plane B4 of the cutting insert shown in FIG. 2.

The third surface 19 is inclined so as to further depart from the central axis O1 than the fourth surface 21 as going from the upper surface 3 toward the lower surface 5. Specifically, the third surface 19 is inclined at an angle θ1 with respect to the central axis O1 in a sectional view. A ridge line is formed between the third surface 19 and the fourth surface 21 because the third surface 19 and the fourth surface 21 are located as described above. In FIGS. 8 and 9, a straight line L orthogonal to the reference plane S and parallel to the central axis O1 is indicated, the central axis O1 is replaced with the straight line L, and the angle θ1 is indicated by an inclination angle with respect to the straight line L. The angle θ1 is settable to, for example, approximately 1-10°. The angle θ1 is preferably identical to the angle θ2.

As described above, the second surface 17 that is the region of the side surface 7 corresponding to the first lower cutting edge 27, and the third surface 19 that is the region of the side surface 7 corresponding to the first upper cutting edge are located so as to depart from the central axis O1 as departing from the cutting edge. The first lower cutting edge 27 and the first upper cutting edge 23 function as the major cutting edge during the cutting process. The second surface 17 and the third surface 19 are configured as described above, thereby making it possible to enhance strength of the first lower cutting edge 27 and the first upper cutting edge 23 which are subjected to a relatively large load.

The side surface 7 in the present embodiment also includes the first surface 15 corresponding to the second upper cutting edge 25, and the fourth surface 21 corresponding to the second lower cutting edge 29. The first source 15 and the fourth source 21 are parallel to the central axis O1 in a sectional view, and are therefore orthogonal to the reference plane S. When the region of the side surface 7 which is located between the second upper cutting edge 25 and the first lower cutting edge 27 is formed by a single surface region, it follows that on the basis of the first lower cutting edge 27, the surface region departs from the central axis O1 as departing from the first lower cutting edge 27. Inevitably on the basis of the second upper cutting edge 25, the surface region approaches the central axis O1 as departing from the second upper cutting edge 25. This can degrade strength of the second upper cutting edge 25.

Similarly, when the region of the side surface 7 which is located between the second lower cutting edge 29 and the first upper cutting edge 23 is made up of a single surface region, it follows that on the basis of the first upper cutting edge 23, the surface region departs from the central axis O1 as departing from the first upper cutting edge 23. Inevitably on the basis of the second lower cutting edge 29, the surface region approaches the central axis O1 as departing from the second lower cutting edge 29. This can degrade strength of the second lower cutting edge 29.

However, the first surface 15 in the present embodiment has a surface configuration separately from the second surface 17 so that a ridge line is formed therebetween. This makes it possible to enhance the strength of the second upper cutting edge 25 while enhancing the strength of the first lower cutting edge 27. Similarly, the fourth surface 21 in the present embodiment has a surface configuration separately from the third surface 19 so that a ridge line is formed therebetween. This makes it possible to enhance the strength of the second lower cutting edge 29 while enhancing the strength of the first upper cutting edge 23.

The second surface 17 is inclined so as to depart from the central axis O1 as going from the lower surface 5 toward the upper surface 3, while the third surface 19 is inclined so as to depart from the central axis O1 as going from the upper surface 3 toward the lower surface 5. Accordingly, a ridge line is also formed between the second surface 17 and the third surface 19.

The insert 1 of the present embodiment includes the upper cutting edges 9 and the lower cutting edges 11, and one of these cutting edge regions is used during a cutting process. For example, when one of the upper cutting edges 9 is used during a cutting process, the rest of the upper cutting edges 9 is not used during the cutting process. A region of the side surface 7 corresponding to each of the upper cutting edges 9 not being used during the cutting process is used as a constraining surface against the holder configured to attach the insert 1 thereto.

During the cutting process, a force is applied to the upper cutting edge 9 being used during the cutting process, in a direction from the upper surface toward the lower surface. The insert 1 is fixed to the holder by a screw fitted into the through hole 13. Therefore, a force is apt to be applied to the location of the upper cutting edge 9 not being used during the cutting process, in a direction from the lower surface toward the upper surface.

On this occasion, when the region of the side surface 7 used as the constraining surface is inclined so as to depart from the central axis O1 of the through hole 13 as going from the upper surface toward the lower surface, an excessively large load can be exerted on the screw. However, in the insert 1 of the present embodiment, the first surface 15 and the fourth surface 21 are parallel to the central axis O1 in a cross section including the central axis O1 of the through hole 13. This makes it possible for the holder to stably fix the insert 1 even on the first surface 15 and the fourth surface 21.

Also when another of the upper cutting edges 9 is used for a cutting process, and when another of the lower cutting edges 11 is used for a cutting process, the insert 1 is stably fixable on the first surface 15 and the fourth surface 21 for the same reason.

Particularly in the insert 1 of the present embodiment, the first surface 15 and the fourth surface 21 are connected to the upper surface 3 and the lower surface 5. It is therefore possible to increase an area of each of the first surface 15 and the fourth surface 21, thereby ensuring that the insert 1 is stably fixable on the first surface 15 and the fourth surface 21.

To be specific, in the insert 1 of the present embodiment, the second surface 17 has a smaller width in the direction orthogonal to the central axis O1 as going from the lower surface 5 toward the upper surface 3 in a side view. Similarly, the third surface 19 has a smaller width in the direction orthogonal to the central axis O1 as going from the upper surface 3 toward the lower surface 5 in a side view. This makes it possible to ensure a large area of each of the first surface 15 and the fourth surface 21.

<Cutting Tool>

Figure 10:
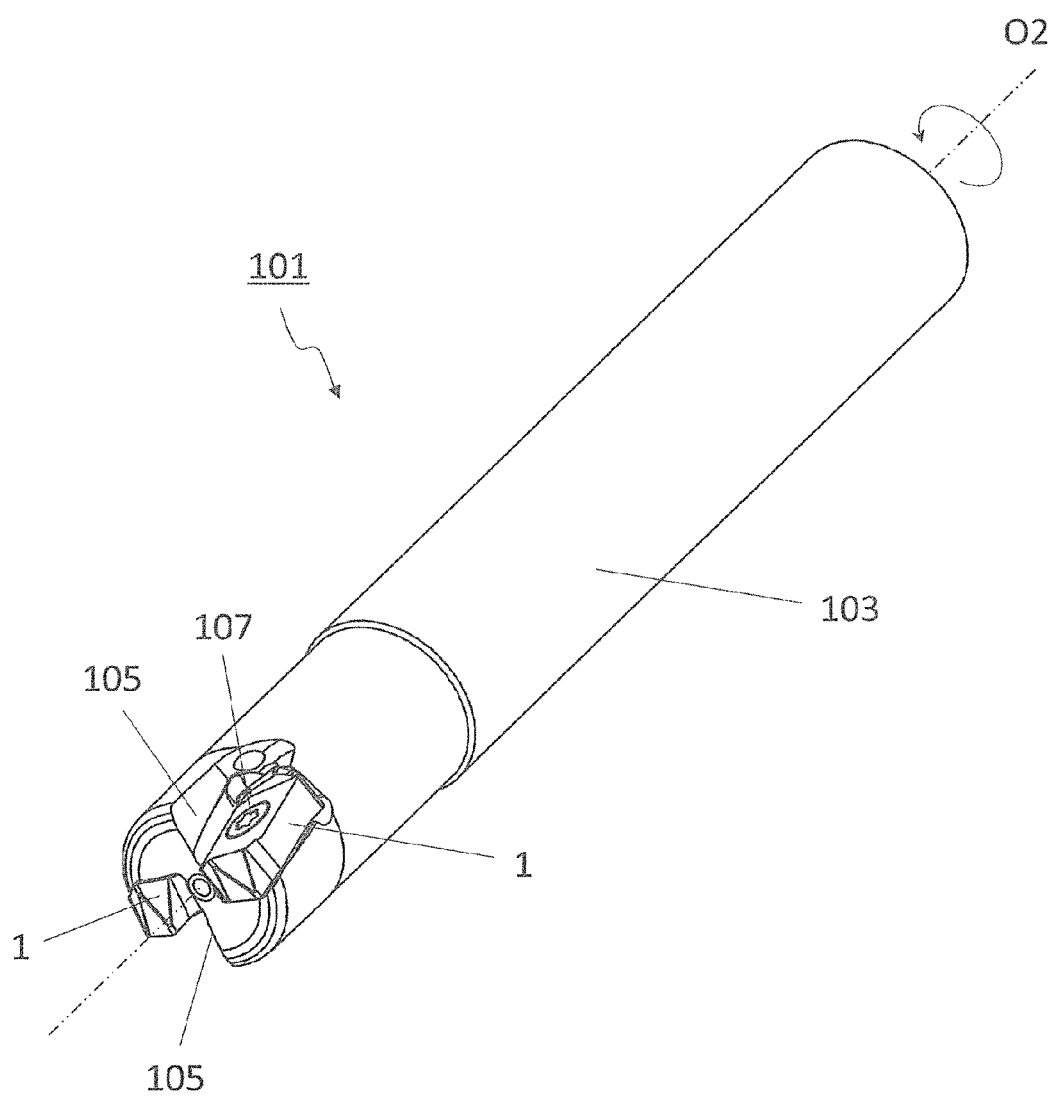
FIG. 10 is a perspective view that shows a cutting tool according to an embodiment of the present invention.
Figure 11:
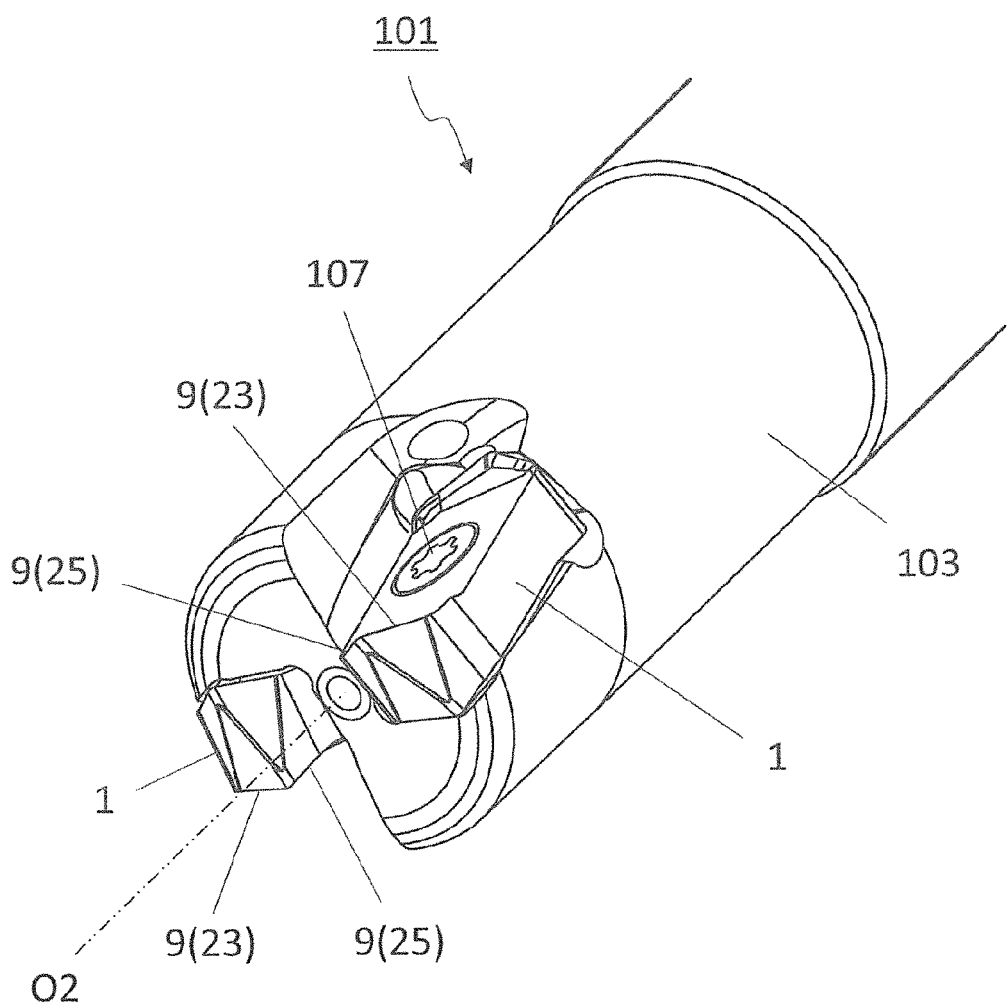
FIG. 11 is an enlarged perspective view of a front end part in the cutting tool shown in FIG. 10.
Figure 12:
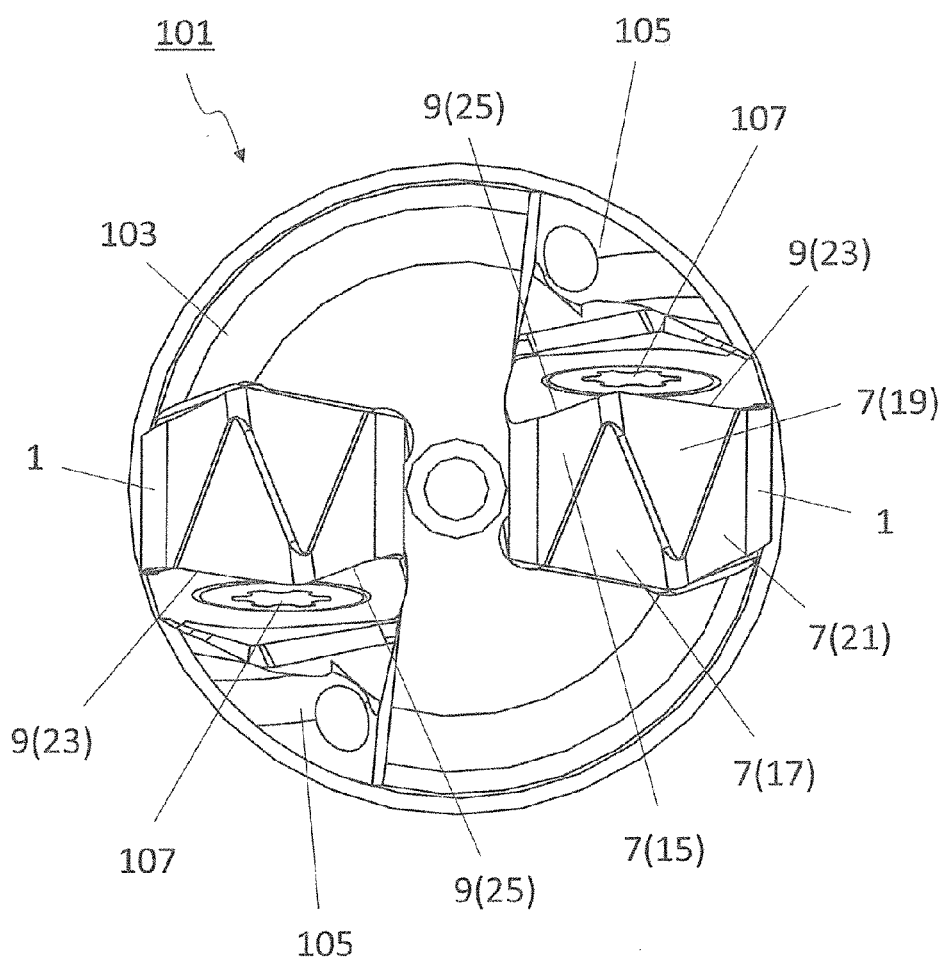
FIG. 12 is a side view of the cutting tool shown in FIG. 10, taken from a front end side thereof along a rotation axis.

A cutting tool 101 of an embodiment of the present invention is described below with reference to FIGS. 10 to 12. FIGS. 10 to 12 show a state in which the insert 1 is attached via a screw 107 to an insert pocket 105 of the holder 103. A chain double-dashed line in FIGS. 10 and 11 indicates a rotation axis O2 of the cutting tool 101.

As shown in FIGS. 10 and 11, the cutting tool 101 of the present embodiment includes the holder 103 having the rotation axis O2 and including a plurality of insert pockets 105 (hereinafter also referred to simply as "pockets 105") on an outer peripheral surface on a front end side of the holder 103, and the insert 1 to be attached to each of the pockets 105.

The holder 103 has an approximately columnar shape around the rotation axis O2. The pockets 105 are disposed on the outer peripheral surface on the front end side of the holder 103. The pockets 105 are portions configured to attach the insert 1 thereto, and open into the outer peripheral surface and a front end surface of the holder 103. The pockets 105 may be disposed at equal intervals or unequal intervals. The holder 103 is provided with the pockets 105 and is therefore not in a strict columnar shape.

The inserts 1 are respectively attached to the pockets 105 disposed on the holder 103. The inserts 1 are attached so that at least a part of the upper cutting edge or the lower cutting edge protrudes forward beyond the front end surface of the holder 103, namely, toward the workpiece beyond the front end surface of the holder 103. Specifically, the inserts 1 in the present embodiment are attached to the holder 103 so that a part of the first upper cutting edge and a part of the second upper cutting edge protrude beyond the front end surface of the holder 103.

Each of the inserts 1 is attached via the screw 107 to the pocket 105 in the present embodiment. That is, each of the inserts 1 is attached to the holder 103 by inserting the screw 107 into the through hole of the insert 1, and then inserting a front end of the screw 107 into a screw hole (not shown) formed in the pocket 105, and thereafter fixing the screw 107 into the screw hole. For example, steel and cast iron are usable as the holder 103. Of these materials, it is particularly preferable to use high-rigidity steel.

<Method of Manufacturing Machined Product>

Figure 13:
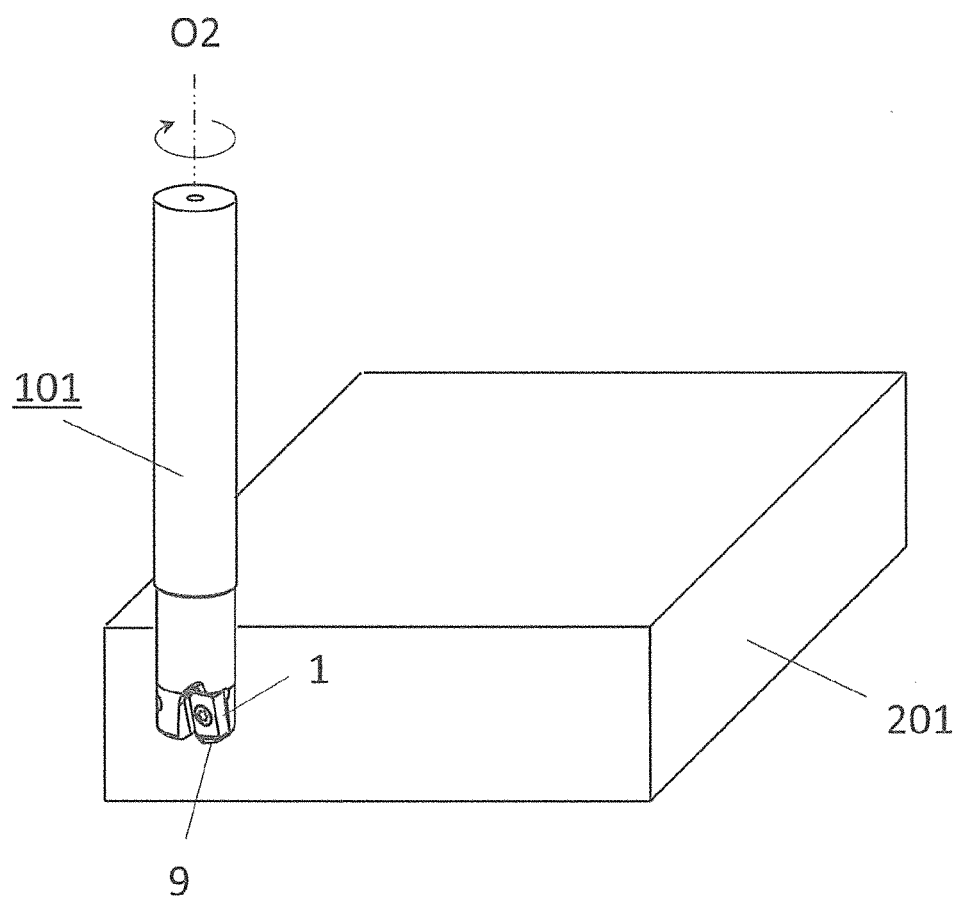
FIG. 13 is a schematic diagram that shows a step of a method of manufacturing a machined product according to an embodiment of the present invention.
Figure 14:
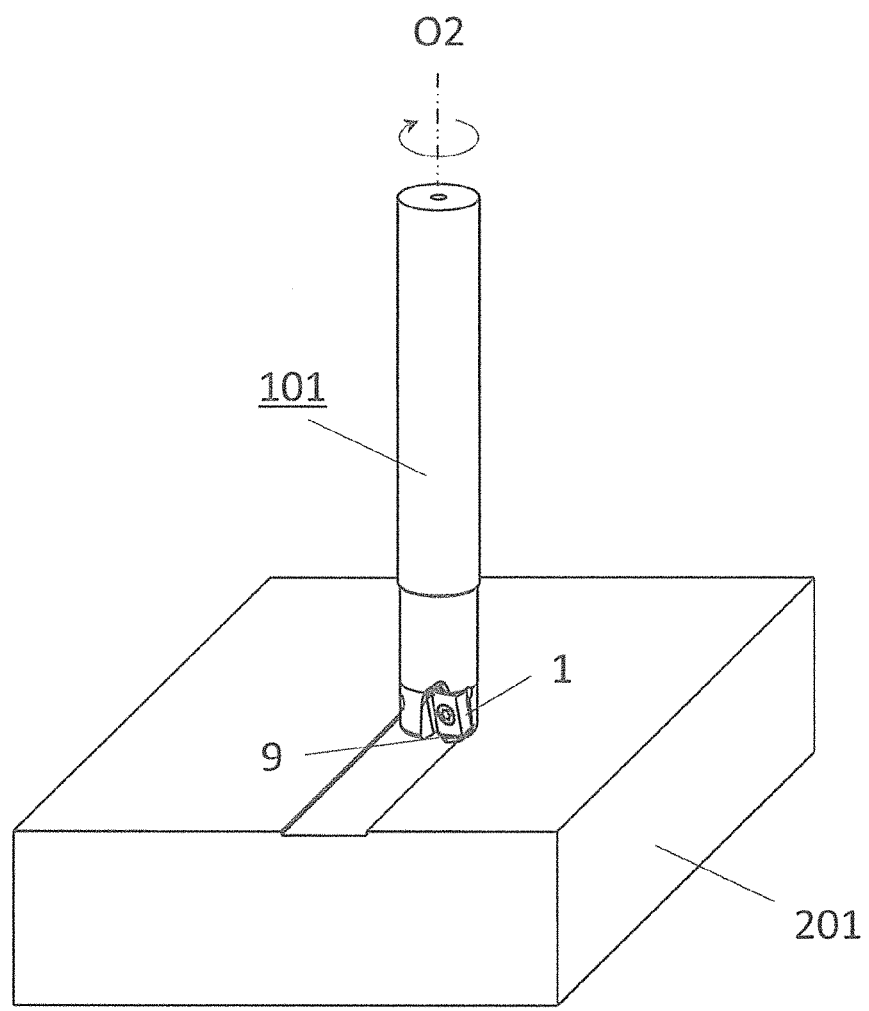
FIG. 14 is a schematic diagram that shows a step of the method of manufacturing a machined product according to the embodiment of the present invention.
Figure 15:
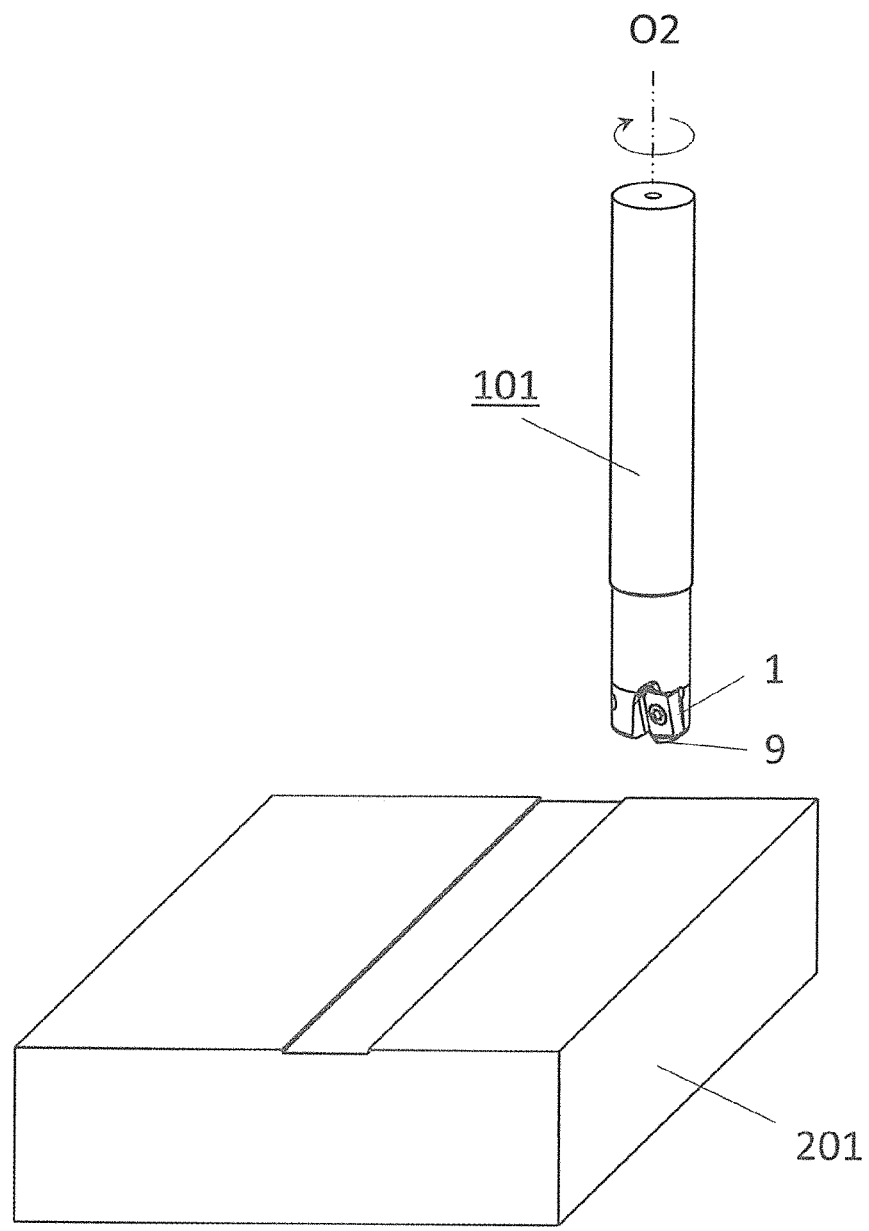
FIG. 15 is a schematic diagram that shows a step of the method of manufacturing a machined product according to the embodiment of the present invention.

A method of manufacturing a machined product according to an embodiment of the present invention is described below with reference to FIGS. 13 to 15. FIGS. 13 to 15 show the method of manufacturing the machined product. The machined product is manufacturable by subjecting a workpiece 201 to a cutting process. The manufacturing method in the present embodiment includes the following steps:

(1) rotating the cutting tool 101 as typified by the foregoing embodiment;
(2) bringing the upper cutting edge 9 or the lower cutting edge in the cutting tool 101 being rotated into contact with the workpiece 201; and
(3) moving the cutting tool 101 away from the workpiece 201.

More specifically, a first step is to bring the cutting tool 101 relatively near the workpiece 201 while rotating the cutting tool 101 around the rotation axis O2. A subsequent step is to cut the workpiece 201 by bringing the upper cutting edge 9 as a cutting edge in the cutting tool 101 into contact with the workpiece 201 as shown in FIG. 14. A final step is to keep the cutting tool 101 relatively away from the workpiece 201 as shown in FIG. 15.

In the present embodiment, the workpiece 201 is fixed and the cutting tool 101 is brought near. In FIGS. 13 to 15, the workpiece 201 is fixed and the cutting tool 101 is rotated around the rotation axis O2. In FIG. 15, the workpiece 201 is fixed and the cutting tool 101 is kept away. Although the workpiece 201 is fixed and the cutting tool 101 is moved in each of the steps during the cutting process in the manufacturing method of the present embodiment, it is, of course, not intended to limit to this embodiment.

For example, in the step (1), the workpiece 201 may be brought near the cutting tool 101. Similarly, in the step (3), the workpiece 201 may be kept away from the cutting tool 101. When the cutting process is continued, it is necessary to repeat the step of bringing the upper cutting edge of the insert 1 into contact with different portions of the workpiece 201, while the cutting tool 101 is kept rotating.

When the upper cutting edge being used is worn away, the upper cutting edge not yet used needs to be used by rotating the insert 1 180 degrees with respect to the central axis of the through hole. When all of the upper cutting edges are worn away, the lower cutting edge needs to be used by turning the insert up and down. Representative examples of the material of the workpiece 201 include carbon steel, alloy steel, stainless steel, cast iron, and nonferrous metals.

DESCRIPTION OF THE REFERENCE NUMERAL 1 cutting insert (insert)
3 upper surface
5 lower surface
7 side surface
9 upper cutting edge
11 lower cutting edge
13 through hole
15 first surface
17 second surface
19 third surface
21 fourth surface
23 first upper cutting edge
25 second upper cutting edge
27 first lower cutting edge
29 second lower cutting edge
101 cutting tool
103 holder
105 insert pocket (pocket)
107 screw
201 workpiece

The invention claimed is:
1. A cutting insert, comprising:
an upper surface comprising a plurality of side parts;
a lower surface comprising a plurality of side parts;
a side surface located between the upper surface and the lower surface;
an upper cutting edge being located along one of the side parts on the upper surface and comprising a first upper cutting edge and a second upper cutting edge;
a lower cutting edge being located along one of the side parts on the lower surface and comprising a first lower cutting edge and a second lower cutting edge; and
a through hole extending between the upper surface and the lower surface,
wherein the first lower cutting edge is located below the second upper cutting edge and the second lower cutting edge is located below the first upper cutting edge,
wherein the side surface comprises a first surface extending downward from the second upper cutting edge, a second surface extending upward from the first lower cutting edge, a third surface extending downward from the first upper cutting edge, and a fourth surface extending upward from the second lower cutting edge,
wherein the first surface and the fourth surface are located along a central axis of the through hole,
wherein the second surface is inclined so as to further depart from the central axis than the first surface as going from the lower surface toward the upper surface, and wherein the third surface is inclined so as to further depart from the central axis than the fourth surface as going from the upper surface toward the lower surface.

2. The cutting insert according to claim 1, wherein the first surface and the fourth surface are connected to the upper surface and the lower surface.

3. The cutting insert according to claim 1,
wherein the second surface has a smaller width in a direction orthogonal to the central axis as going from the lower surface toward the upper surface, and
wherein the third surface has a smaller width in a direction orthogonal to the central axis as going from the upper surface toward the lower surface.

4. The cutting insert according to claim 1, wherein each of the first surface, the second surface, the third surface and the fourth surface comprises a flat surface.

5. The cutting insert according to claim 1,
wherein the first upper cutting edge and the second upper cutting edge are individually in a straight line form in a top view, and
wherein the first lower cutting edge and the second lower cutting edge are individually in a straight line form in a bottom view.

6. The cutting insert according to claim 5,
wherein the upper cutting edge is in a protruded shape having an obtuse angle formed by the first upper cutting edge and the second upper cutting edge in a top view, and
wherein the lower cutting edge is in a protruded shape having an obtuse angle formed by the first lower cutting edge and the second lower cutting edge in a bottom view.

7. A cutting tool, comprising:
a holder having an insert pocket on a front end side of the holder; and
a cutting insert according to claim 1, the cutting insert being attached to the insert pocket so that at least a part of the upper cutting edge or the lower cutting edge projects beyond the holder.

8. A method of manufacturing a machined product, comprising:
rotating a cutting tool according to claim 7;
bringing the upper cutting edge or the lower cutting edge in the cutting tool being rotated into contact with a workpiece; and
moving the cutting tool away from the workpiece.

* * * * *